United States Patent
Bitou et al.

(10) Patent No.: US 8,454,239 B2
(45) Date of Patent: Jun. 4, 2013

(54) FLUID DYNAMIC BEARING DEVICE AND ASSEMBLING METHOD THEREOF

(75) Inventors: Kimihiko Bitou, Kuwana (JP); Isao Komori, Kuwana (JP); Tetsuya Kurimura, Kuwana (JP)

(73) Assignee: NTN Corporation, Osaka-shi (JP)

( * ) Notice: Subject to any disclaimer, the term of this patent is extended or adjusted under 35 U.S.C. 154(b) by 696 days.

(21) Appl. No.: 12/665,384

(22) PCT Filed: Jul. 18, 2008

(86) PCT No.: PCT/JP2008/063055
§ 371 (c)(1),
(2), (4) Date: Dec. 18, 2009

(87) PCT Pub. No.: WO2009/016983
PCT Pub. Date: Feb. 5, 2009

(65) Prior Publication Data
US 2010/0189383 A1 Jul. 29, 2010

(30) Foreign Application Priority Data

Jul. 31, 2007 (JP) .................................. 2007-199527
Aug. 21, 2007 (JP) .................................. 2007-214775
Jun. 19, 2008 (JP) .................................. 2008-160592

(51) Int. Cl.
*F16C 32/06* (2006.01)
(52) U.S. Cl.
USPC ............ 384/107; 384/100; 384/119; 384/124

(58) Field of Classification Search
USPC ................. 384/100, 107, 112, 114, 121, 123, 384/119, 124; 360/99.07; 310/67 R, 90.05
See application file for complete search history.

(56) References Cited

U.S. PATENT DOCUMENTS

| | | | |
|---|---|---|---|
| 5,623,382 A * | 4/1997 | Moritan et al. ............. | 360/99.08 |
| 7,005,768 B2 * | 2/2006 | Tamaoka et al. ............. | 384/132 |
| 7,296,931 B2 * | 11/2007 | Kurimura et al. ............. | 384/107 |
| 7,345,392 B2 * | 3/2008 | Hafen et al. .................. | 384/112 |
| 7,576,947 B2 * | 8/2009 | Higuchi et al. ............. | 360/99.08 |
| 2003/0169952 A1 | 9/2003 | Yamashita et al. | |
| 2003/0174914 A1 * | 9/2003 | Kull et al. ..................... | 384/107 |
| 2005/0044714 A1 | 3/2005 | Yamashita et al. | |
| 2005/0180668 A1 * | 8/2005 | Yazawa ........................ | 384/100 |
| 2006/0140521 A1 * | 6/2006 | Uenosono et al. ............ | 384/100 |

FOREIGN PATENT DOCUMENTS

| | | |
|---|---|---|
| JP | 2003-239951 A | 8/2003 |
| JP | 2005-113987 A | 4/2005 |
| JP | 2005180467 A * | 7/2005 |
| JP | 2005-226780 A | 8/2005 |
| JP | 2007-154959 A | 6/2007 |

OTHER PUBLICATIONS

International Search Report of PCT/JP2008/063055, mailing date of Oct. 14, 2008.

(Continued)

*Primary Examiner* — Marcus Charles
(74) *Attorney, Agent, or Firm* — Westerman, Hattori, Daniels & Adrian, LLP (57) ABSTRACT

A first axial gap (L1) is formed between a seal portion (9) and a sleeve portion (8). With this, it is possible to set a moving amount of a shaft member (2) in an axial direction with high accuracy irrespective of accuracy of members such as the sleeve portion (8).

16 Claims, 9 Drawing Sheets

OTHER PUBLICATIONS

Notification of Transmittal of Translation of the International Preminary Report on Patentability (Forms PCT/IB/338) of International Application No. PCT/JP2008/063055 mailed Mar. 4, 2010 with Forms PCT/IB/373 and PCT/ISA/237.

Japanese Office Action mailed Jun. 4, 2012, issued in corresponding Japanese Patent Application No. 2007-199527 (3 pages).

* cited by examiner

FLUID DYNAMIC BEARING DEVICE AND ASSEMBLING METHOD THEREOF

TECHNICAL FIELD

The present invention relates to a fluid dynamic bearing device for rotatably supporting a shaft member with a fluid film generated in a bearing gap and an assembling method thereof.

BACKGROUND ART

Due to its high rotational precision and calmness, a fluid dynamic bearing device can be suitably used in a spindle motor for an information apparatus, such as a magnetic disk drive like an HDD, an optical disk drive for a CD-ROM, CD-R/RW, DVD-ROM/RAM or the like, or a magneto-optical disk drive for an MD, MO or the like, a polygon scanner motor of a laser beam printer (LBP), a motor for a projector color wheel, or a small motor, such as a fan motor for cooling an electrical apparatus or the like.

For example, in the fluid dynamic bearing device disclosed in Patent Document 1, a radial bearing gap is formed between an outer peripheral surface of the shaft member and an inner peripheral surface of a sleeve portion, the shaft member being supported in a radial direction with a fluid film generated in the radial bearing gap and being supported in a thrust direction by bringing a spherical protruding portion provided at a lower end portion of the shaft member and a thrust plate provided on an inner bottom surface of a housing in sliding contact with each other. Further, in the fluid dynamic bearing device, the shaft member includes a smaller diameter portion and a larger diameter portion so as to exhibit a stepped shape, and an annular seal portion is provided on an inner periphery of an opening portion of the housing. The seal portion is engaged with a shoulder surface of the shaft member in an axial direction so as to retain the shaft member.

Patent Document 1: JP 2005-113987 A

DISCLOSURE OF THE INVENTION

Problem to be solved by the Invention

In the fluid dynamic bearing device, the shaft member is allowed to move in the axial direction by an amount corresponding to an axial gap formed between the seal portion and the shoulder surface of the shaft member. When the axial gap is excessively large, a moving amount of the shaft member in the axial direction becomes excessively larger, axial backlash is caused to a disk of an HDD, the disk being mounted to the shaft member. As a result, reading accuracy of the disk may be deteriorated, and the disk and a head may interfere with each other. Accordingly, it is necessary to set with high accuracy the axial gap formed between the seal portion and the shoulder surface of the shaft member.

However, in the fluid dynamic bearing device described above, the seal portion is positioned by being brought into contact with the sleeve portion, and hence fixation accuracy of the seal portion to the housing depends on processing accuracy of an axial dimension of the sleeve portion. Thus, in order to control the moving amount of the shaft member in the axial direction with high accuracy, it is necessary to process the sleeve portion with high accuracy, which involves an increase in processing cost.

It is therefore an object of the present invention to provide a fluid dynamic bearing device and an assembling method thereof, the fluid dynamic bearing device being capable of controlling the moving amount of the shaft member in the axial direction with high accuracy and at low cost.

Means for Solving the Problem

In order to solve the above-mentioned problem, according to the present invention, a fluid dynamic bearing device includes: a shaft member including: a smaller diameter portion; a larger diameter portion; and a shoulder surface formed therebetween; a sleeve portion in which the larger diameter portion of the shaft member is inserted along an inner periphery thereof; a seal portion which forms, between the seal portion and an outer peripheral surface of the smaller diameter portion of the shaft member, a seal space for preventing a lubricating fluid in an inside of the fluid dynamic bearing device from leaking to an outside, and which retains the shaft member by being engaged with the shoulder surface of the shaft member in an axial direction; a radial bearing portion for supporting the shaft member in a radial direction with a fluid film generated in a radial bearing gap between an outer peripheral surface of the larger diameter portion of the shaft member and an inner peripheral surface of the sleeve portion; and a thrust bearing portion for supporting the shaft member in a thrust direction, in which a first axial gap is formed between the seal portion and the sleeve portion.

As described above, in the fluid dynamic bearing device of the present invention, the first axial gap is formed between the seal portion and the sleeve portion so as to keep the seal portion and the sleeve portion out of contact with each other, and hence shape accuracy of the sleeve portion can be eliminated from the factors of determining the positioning accuracy of the seal portion. Accordingly, the moving amount of the shaft member can be controlled not only with processing accuracy of the sleeve portion but only with positional accuracy of the seal portion. With this, it is possible to decrease the processing accuracy of the sleeve portion, and hence possible to reduce processing cost.

In the fluid dynamic bearing device, a second axial gap is formed between the seal portion and the shoulder surface of the shaft member. It is preferred that the second axial gap be set to be equal to or smaller than a radial gap of the seal space. With this, in the second axial gap, it is possible to provide a drawing-in effect of a lubricating fluid with a capillary force equal to or larger than that in the seal space, and hence possible to reliably prevent the lubricating fluid filling an inside of the fluid dynamic bearing device from leaking to an outside.

For example, when the fluid dynamic bearing device is used in an HDD spindle motor, it is necessary to minimize the moving amount of the shaft member in the axial direction for the purpose of preventing a disk mounted to the shaft member from interfering with a head. In this case, when the second axial gap is set to be 30 μm or smaller, it is possible to prevent the disk and the head from interfering with each other even when the fluid dynamic bearing device is used for the above-mentioned application.

When the fluid dynamic bearing device as described above is operated, local negative pressure is generated in the lubricating fluid in the inside of the bearing, specifically, the lubricating fluid filling the space facing a lower end portion of the shaft member. As a result, air bubbles are generated in a fluid film in the radial bearing gap, and hence a supporting force of the fluid film with respect to the shaft member may be decreased. In this context, between the sleeve portion and the housing in which the sleeve portion is accommodated on an inner periphery thereof, there is provided a communication path opening at one end thereof to the first axial gap and opening at the other end thereof to the space facing the lower end portion of the shaft member. With this, a space in a thrust bearing portion is communicated with the seal space through intermediation of the communication path and the first axial gap. As a result, it is possible to prevent generation of the local negative pressure, and possible to maintain good pressure balance in the lubricating fluid filling the inside of the bearing. Therefore, it is possible to avoid deterioration in bearing performance.

In this case, when a groove is formed in an end surface and an outer peripheral surface of the sleeve portion so as to constitute the communication path described above, an inner bottom surface and an inner peripheral surface of the housing are allowed to have a flat-surface shape or a cylindrical-surface shape. As a result, it is possible to facilitate formation of the housing, and hence possible to achieve cost reduction.

While the shaft member having a stepped shape as described above may be integrally formed, this should not be construed restrictively. For example, the shaft member may be constituted by a shaft portion and a hollow member fixed to an outer peripheral surface of the shaft portion, and the shoulder surface of the shaft member may be constituted by an end surface of the hollow member. In this case, it is possible to constitute the shaft member having a stepped shape by the shaft portion and the hollow portion each having a simple shape, and hence possible to reduce processing cost of the shaft member.

Figure 2:
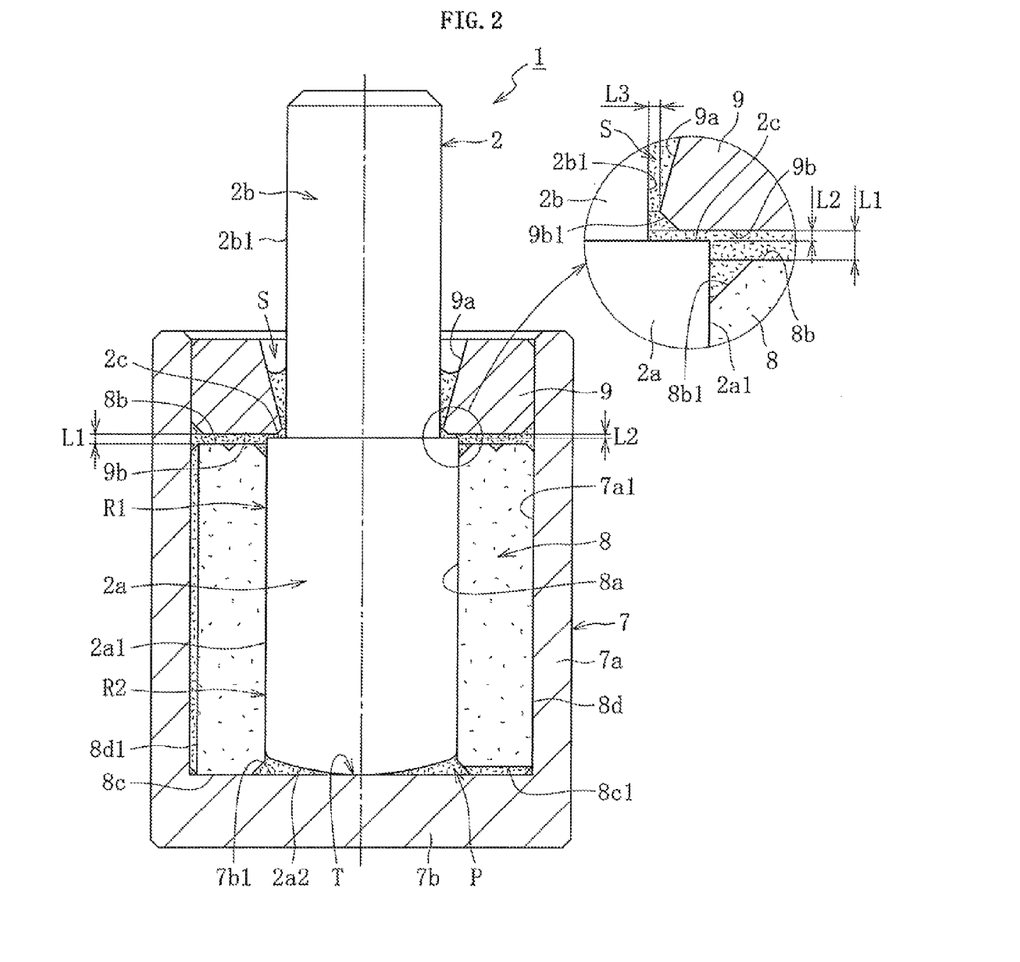
FIG. 2 A sectional view of the fluid dynamic bearing device.

For example, when the thrust bearing portion is constituted by a so-called pivot bearing in which a spherical protruding portion is formed at an end of the shaft member and the spherical protruding portion is brought into sliding contact with a mating member (inner bottom surface of the housing, for example), there is formed a space between the spherical protruding portion of the end of the shaft member and the inner bottom surface of the housing (indicated by P in FIG. 2). A lubricant fills the inside of the bearing including the space. In this case, when the shaft member is constituted by the shaft portion and the hollow member and an end portion of the hollow member is extended to an outer periphery of the spherical protruding portion of the shaft portion, a part of the space facing the spherical protruding portion of the shaft portion can be plugged with the hollow member (refer to FIG. 7). With this, it is possible to reduce an amount of the lubricant filling the inside of the bearing, and hence possible to reduce the seal space functioning as a buffer for absorbing thermal expansion of the lubricant. Thus, the bearing device is reduced in thickness or a bearing span between radial bearing portions are increased, which leads to an increase in bearing rigidity.

The fluid dynamic bearing device as described above is capable of controlling the moving direction of the shaft member in the axial direction with high accuracy, and hence can be suitably used in application in which the moving amount in the axial direction of the shaft member of an HDD spindle motor or the like is to be controlled with accuracy as high as possible.

Further, it order to solve the above-mentioned problem, according to the present invention, there is provided an assembling method for a fluid dynamic bearing device, the fluid dynamic bearing device including: a shaft member including: a smaller-diameter outer peripheral surface; a larger-diameter outer peripheral surface; and a shoulder surface formed therebetween; a housing in which the shaft member is accommodated on an inner periphery thereof; a seal portion which is fixed to the inner periphery of the housing so as to form, between the seal portion and the smaller-diameter outer peripheral surface of the shaft member, a seal space for preventing a lubricating fluid in an inside of the fluid dynamic bearing device from leaking to an outside, and which retains the shaft member by being engaged with the shoulder surface of the shaft member in an axial direction; and radial bearing gaps facing the larger-diameter outer peripheral surface of the shaft member, the assembling method including setting, by moving the seal portion with respect to the housing in an axial direction, an axial gap between the seal portion and the shoulder surface of the shaft member.

As described above, in the assembling method for a fluid dynamic bearing device according to the present invention, the axial gap between the seal portion and the shoulder surface of the shaft member is not set with reference to the sleeve portion, but set by moving the seal portion in the axial direction with respect to the housing, the axial gap corresponding to a stroke amount of the shaft member (moving amount in the axial direction). With this, it is possible to control the stroke amount of the shaft member irrespective of shape accuracy of the sleeve portion, and hence possible to reduce processing cost owing to a decrease in the processing accuracy of the sleeve portion.

Setting of the axial gap by moving the seal portion as described above can be performed, for example, by accommodating the shaft member and the seal portion on the inner periphery of the housing so as to bring the seal portion into contact with the shoulder surface of the shaft member, and then moving the seal portion with the shaft member by a predetermined amount toward the opening of the housing.

In the fluid dynamic bearing device, when a smaller-diameter outer peripheral surface, a larger-diameter outer peripheral surface, and the shoulder surface of the shaft member are formed integrally with each other, perpendicularity, coaxiality, and the like of those surfaces can be adjusted with high accuracy. Accordingly, it is possible to set with high accuracy the radial bearing gaps facing the larger-diameter outer peripheral surface and the seal space facing the smaller-diameter outer peripheral surface, and hence possible to provide excellent bearing performance and a sealing function.

Further, the shaft member may be constituted by the shaft portion and the sleeve portion fixed to the outer peripheral surface of the shaft portion. In this case, the shoulder surface of the shaft member is constituted by an end surface of the sleeve portion. With this, it is possible to simplify the shapes of the shaft portion and the sleeve portion which constitute the shaft member, and hence possible to reduce processing cost of the members. Further, in a case of constituting the shaft member with the shaft portion and the sleeve portion as described above, when the sleeve portion is formed by die molding together with the shaft portion as an insert, it is unnecessary to perform an assembly step for the shaft portion and the sleeve portion, and hence possible to further reduce manufacturing cost of the shaft member.

When a lubricant is interposed between engagement surfaces of both the seal portion and the housing in moving the seal portion with respect to the housing, the seal portion can be smoothly moved, and hence the gap can be set with higher accuracy. When an adhesive is used as the lubricant, fixation strength between the seal portion and the housing can be increased in addition to the above-mentioned effect.

Further, after positioning of the seal portion, by bonding the engagement surfaces of the seal portion and the housing to each other in a sealing manner on a side opening to air, it is possible to reliably prevent the lubricating fluid filling the inside of the bearing device from leaking from the engagement surfaces of the seal portion and the housing to an outside.

Effects of the Invention

As described above, according to the present invention, it is possible to provide a fluid dynamic bearing device capable of controlling the moving amount of the shaft member in the axial direction with high accuracy and at low cost.

BEST MODE FOR CARRYING OUT THE INVENTION

In the following, embodiments of the present invention is described with reference to the drawings.

Figure 1:
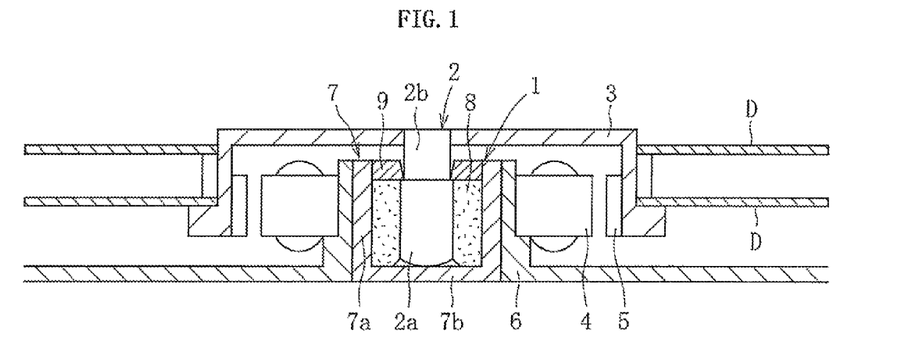
FIG. 1 A sectional view of an HDD spindle motor incorporating a fluid dynamic bearing device.

FIG. 1 is a conceptual diagram illustrating a construction example of a spindle motor for an information apparatus in which a fluid dynamic bearing device 1 according to an embodiment of the present invention in which the fluid dynamic bearing device 1 is incorporated. This spindle motor is used in a disk drive such as an HDD, and is provided with the fluid dynamic bearing device 1 for rotatably supporting a shaft member 2 attached with a disk hub 3, a stator coil 4 and a rotor magnet 5 which are opposed to each other through intermediation of a radial gap, and a motor bracket 6. The stator coil 4 is attached to the outer periphery of the motor bracket 6, and the rotor magnet 5 is attached to the inner periphery of the disk hub 3. The housing 7 of the fluid dynamic bearing device 1 is fixed along the inner periphery of the motor bracket 6. The disk hub 3 retains one or multiple (two in FIG. 1) disc-like information storage media, such as magnetic disks (hereinafter simply referred to as "disks") D. In the spindle motor constructed as described above, when the stator coil 4 is energized, the rotor magnet 5 is caused to rotate by an electromagnetic force generated between the stator coil 4 and the rotor magnet 5, and with this rotation, the disk hub 3 and the disks D retained by the disk hub 3 rotate integrally with the shaft member 2.

As illustrated in FIG. 2, the fluid dynamic bearing device 1 mainly includes the shaft member 2, the sleeve portion 8 in which the shaft member 2 is inserted along an inner periphery thereof, the housing 7 having a bottomed-cylindrical shape and retaining the sleeve portion 8 from an outer periphery thereof, and the seal portion 9 provided to an opening portion of the housing 7. Note that, in the following description, the opening side of the housing 7 is an upper side and a closed side thereof is a lower side in an axial direction.

The shaft member 2 is formed by lathe-turning of a metal material such as an Stainless steel. The shaft member 2 integrally includes a larger diameter portion 2a arranged on an inner periphery of the sleeve portion 8 and a smaller diameter portion 2b provided on an upper side of the larger diameter portion 2a. A shoulder surface 2c is provided between the larger diameter portion 2a and the smaller diameter portion 2b of the shaft member 2. A spherical protruding portion 2a2 is provided to a lower end portion of the shaft member 2.

The sleeve portion 8 is formed into a cylindrical shape of a porous body formed of a sintered metal whose main component is copper, for example. Alternatively, the sleeve portion 8 may be formed of other metals, resins, or ceramics.

Figure 3:
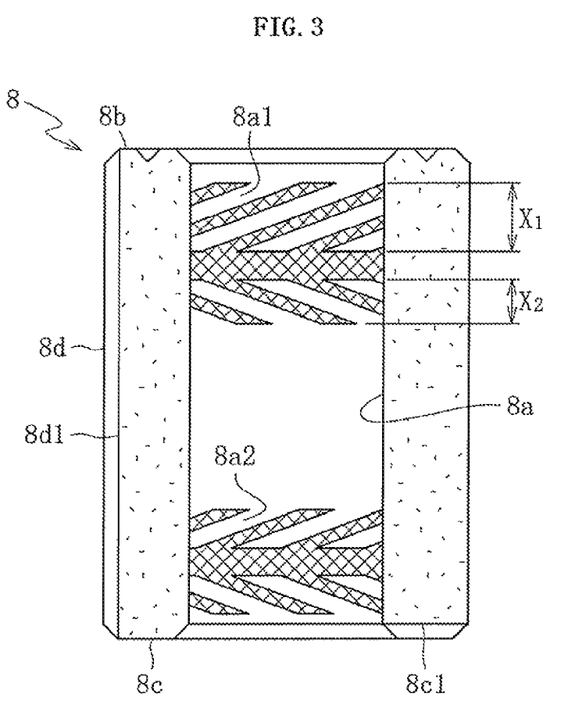
FIG. 3 A sectional view of a sleeve portion.

On an inner peripheral surface 8a of the sleeve portion 8, as illustrated, for example, in FIG. 3, there are formed, as radial dynamic pressure generating portions, two regions which are spaced apart from each other in the axial direction and in which a plurality of dynamic pressure generating grooves 8a1 and 8a2 are respectively arranged in a herringbone pattern. The regions in which the dynamic pressure generating grooves 8a1 and 8a2 are respectively formed are opposed to an outer peripheral surface 2a1 (larger-diameter outer peripheral surface 2a1) of the larger diameter portion 2a of the shaft member 2, the regions serving as a radial bearing surface. When the shaft member 2 is rotated, radial bearing gaps are formed between the regions and the outer peripheral surface 2a1 of the shaft member 2 (refer to FIG. 2). Further, the dynamic pressure generating grooves 8a1 on an upper side are formed asymmetrically in the axial direction with respect to an annular smooth portion formed between upper and lower inclined grooves. Specifically, of the upper dynamic pressure generating grooves 8a1, an axial dimension X1 of an upper region with respect to the annular smooth portion is larger than an axial dimension X2 of a lower region (X1>X2).

In an outer peripheral surface 8d of the sleeve portion 8, there are formed one or a plurality of grooves 8d1 extending over the entire axial direction. Further, in a lower end surface 8c of the sleeve portion 8, there are formed one or a plurality of grooves 8c1 extending in a radial direction. In a state in which the sleeve portion 8 is fixed to an inner periphery of the housing 7, communication paths for a lubricating oil are constituted between the axial grooves 8d1 and the radial grooves 8c1 and an inner peripheral surface 7a1 and an inner bottom surface 7b1 of the housing 7, respectively (refer to FIG. 2). The axial grooves 8d1 and the radial grooves 8c1 can be molded simultaneously with powder-press molding of the sleeve portion 8 with use of a molding die which is provided with parts corresponding to the axial grooves 8d1 and the radial grooves 8c1 in advance so as to be used for powder-press molding of the sleeve portion 8.

The housing 7 is formed by injection molding of a crystalline resin such as liquid crystal polymer (LCP), polyphenylene sulfide (PPS), and polyetherether ketone (PEEK), or of a resin composition with a base resin formed of an amorphous resin such as polyphenyl sulfone (PPSU), polyether sulfone (PES), and polyether imide (PEI). The housing 7 is formed into a bottomed-cylindrical shape. In this embodiment, as illustrated in FIG. 2, a side portion 7a and a bottom portion 7b closing a lower end portion of the side portion 7a are integrally formed. According to the purpose, in the resin composition forming the housing 7, an appropriate amount of the base resin may be used in, for example, a fibrous filler such as glass fiber, a whisker-like filler such as potassium titanate, a scaly filler such as mica, and a fibrous or a powdered conductive filler, such as carbon fiber, carbon black, graphite, carbon nanomaterial, or various kinds of metal powder.

The injection material of the housing 7 is not limited to the above-mentioned ones. For example, a low-melting metal material such as a magnesium alloy or an aluminum alloy are useable. Further, the housing 7 may be formed by MIM molding in which the composite of metal powder and binder is injection-molded to be degreased and sintered. Alternatively, the housing 7 may be press molded using a metal material such as elastic metal including brass. Further, the bottom portion 7b of the housing 7 is not necessarily formed integrally with the side portion 7b thereof, and is formed separately from the side portion 7a.

To the inner peripheral surface 7a1 of the housing 7, the outer peripheral surface 8d of the sleeve portion 8 is fixed by an appropriate means such as bonding (including loose bonding and press-fit bonding), press-fitting, or welding.

The inner bottom surface 7b1 of the housing 7 (upper end surface 7b1 of bottom portion 7b) functions as a thrust bearing portion T for supporting the spherical protruding portion 2a2 at the lower end portion of the shaft member 2 in a contact manner. As described above in this embodiment, the thrust bearing portion T is directly formed in the housing 7. However, this should not be construed restrictively. For example, the thrust bearing portion T may be formed on a thrust washer which is separately formed of a resin material, a sintered material, and the like excellent in abrasion resistance and sliding properties and is arranged on the inner bottom surface of the housing 7. In this case, the housing 7 is free from sliding contact with the shaft member 2, and hence it is unnecessary for the material for the housing 7 to have abrasion resistance. As a result, a higher degree of freedom in selection of the material for the housing 7 is ensured.

The seal portion 9 is annularly formed of a metal material or a resin material. The seal portion 9 is fixed to an inner periphery of an upper end portion of the side portion 7*a* of the housing 7 by press-fitting, press-fit bonding, or the like. An inner peripheral surface 9*a* of the seal portion 9 is formed into a tapered shape by gradually increased upward in diameter. The inner peripheral surface 9*a* of the seal portion 9 is opposed to an outer peripheral surface 2*b*1 (smaller-diameter outer peripheral surface 2*b*1) of the smaller diameter portion 2*b* of the shaft member 2. An annular seal space S gradually reduced downward in radial dimension is formed between the inner peripheral surface 9*a* and the outer peripheral surface 2*b*1. A lubricating oil, for example, is supplied as a lubricating fluid into an inner space of the housing 7 sealed by the seal portion 9, and fill the inside of the housing 7 (dotted area in FIG. 2). In this state, an oil level of the lubricating oil is maintained within a range of the seal space S. Simultaneously, as illustrated FIG. 2 in an enlarged manner, the lubricating oil also fills a space between an inner peripheral chamfer 9*b*1 of a lower end surface 9*b* of the seal portion 9 and the outer peripheral surface 2*b*1 of the smaller diameter portion 2*b* of the shaft member 2, and a space between an inner peripheral chamfer 8*b*1 of an upper end surface 8*b* of the sleeve portion 8 and the outer peripheral surface 2*a*1 of the larger diameter portion 2*a* of the shaft member 2.

Between the lower end surface 9*b* of the seal portion 9 and the upper end surface 8*b* of the sleeve portion 8, there is formed a first axial gap L1. Further, between the lower end surface 9*b* of the seal portion 9 and the shoulder surface 2*c* of the shaft member 2, there is formed a second axial gap L2. The shaft member 2 is allowed to move in the axial direction by an amount corresponding to the second axial gap L2. In this manner, the seal portion 9 and the sleeve portion 8 are kept out of contact with each other owing to the first axial gap L1 provided therebetween. As a result, a moving amount of the shaft member 2 in the axial direction, that is, the second axial gap L2 can be controlled only with positional accuracy of the seal portion 9 irrespective of processing accuracy of the sleeve portion.

Further, when the fluid dynamic bearing device 1 is used in an HDD spindle motor as in this embodiment, in order to prevent interference between the disks and the head, it is desirable that the second axial gap L2 be set to be 30 μm or smaller, preferably, 20 μm or smaller. In addition, it is desirable that the second axial gap L2 be set to be equal to or smaller than a radial dimension L3 (L2≦L3) which is smallest in the seal space S. With this, in the second axial gap L2, it is possible to provide a capillary force equal to or larger than that in the seal space S, and hence possible to prevent the lubricating oil from leaking to the outside.

Figure 4A:
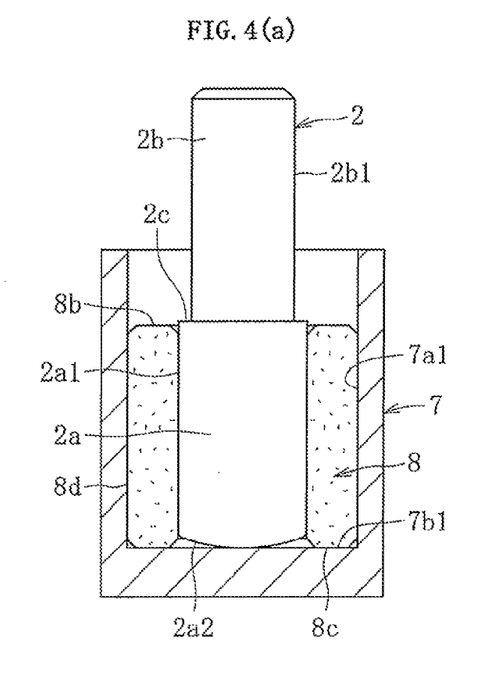
FIG. 4(a) A sectional view illustrating a setting method for a second axial gap.

The second axial gap L2 can be set in the following manner, for example. First, as illustrated in FIG. 4(*a*), the sleeve portion 8 and the shaft member 2 are accommodated on the inner periphery of the housing 7. Specifically, the sleeve portion 8 is inserted along the inner periphery of the housing 7, the lower end surface 8*c* of the sleeve portion 8 is brought into contact with the inner bottom surface 7*b*1 of the housing 7, and the sleeve portion 8 is fixed to the inner peripheral surface 7*a*1 of the housing 7. The shaft member 2 is inserted along the inner periphery of the sleeve portion 8, and the spherical protruding portion 2*a*2 at the lower end of the shaft member 2 is brought into contact with the inner peripheral surface 7*a*1 of the housing 7. In this context, axial dimensions of the larger diameter portion 2*a* of the shaft member 2 and the sleeve portion 8 are preset such that the shoulder surface 2*c* of the shaft member 2 is positioned on the upper side (opening side of the housing) with respect to the upper end surface 8*b* of the sleeve portion 8 in this state.

Figure 4B:
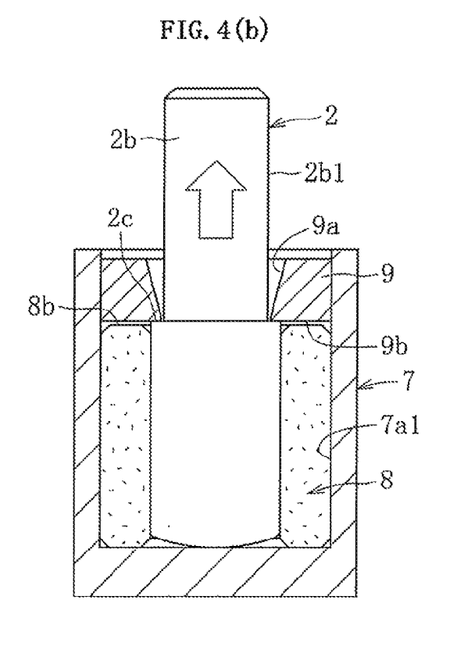
FIG. 4(b) A sectional view illustrating a setting method for the second axial gap.

Next, as illustrated in FIG. 4(*b*), the seal portion 9 is inserted along the inner peripheral surface 7*a*1 of the housing 7, and the lower end surface 9*b* is brought into contact with the shoulder surface 2*c* of the shaft member 2. After that, as indicated by the arrow in FIG. 4(*b*), the shaft member 2 is pulled up with respect to the housing 7. With this, the seal portion 9 engaged with the shoulder surface 2*c* of the shaft member 2 is moved upward with respect to the housing 7 by an amount corresponding to the second axial gap L2 illustrated in FIG. 2. In this state, the seal portion 9 is fixed to the inner peripheral surface 7*a*1 of the housing 7, with the result that the second axial gap L2 is set. The seal portion 9 and the housing 7 are fixed to each other by press-fitting, for example, and in this case, positioning and fixation of the seal portion 9 are completed at the time point when the shaft member 2 is pulled up by a predetermined amount. In this case, when an adhesive is interposed between engagement surfaces of both the seal portion 9 and the housing 7, fixation strength therebetween is increased, and it is possible to reliably prevent oil leakage from an inside of a unit. Further, when an adhesive is applied prior to insertion of the seal portion 9 into the housing 7, the adhesive functions as a lubricant, and hence the insertion and movement of the seal portion 9 is facilitated.

In this manner, the second axial gap L2, that is, the moving amount of the shaft member 2 in the axial direction can be set with high accuracy with a pulling-up amount of the shaft member 2. That is, the moving amount of the shaft member 2 in the axial direction can be directly controlled not with the processing accuracy of the sleeve portion 8 but with the pulling-up amount of the shaft member 2. Accordingly, it is possible to control the moving amount of the shaft member 2 in the axial direction with high accuracy, and hence possible to reduce manufacturing cost owing to a decrease in the processing accuracy of the sleeve portion 8.

In the fluid dynamic bearing device 1 structured as described above, when the shaft member 2 is rotated, radial bearing portions (regions in which dynamic pressure generating grooves 8*a*1 and 8*a*2 are formed in inner peripheral surface 8*a*) are opposed to the outer peripheral surface 2*a*1 of the larger diameter portion 2*a* of the shaft member 2 through intermediation of the radial bearing gaps. In accordance with the rotation of the shaft member 2, the lubricating oil in the radial bearing gaps is pushed toward the annular smooth portion in the axial center of the dynamic pressure generating grooves 8*a*1 and 8*a*2, and pressure thereof is increased. Owing to the dynamic pressure effect as described above of the dynamic pressure generating grooves 8*a*1 and 8*a*2, there are constituted a first radial bearing portion R1 and a second radial bearing portion R2 which support the shaft member 2 in the radial direction in a non-contact manner.

Simultaneously, the spherical protruding portion 2*a*2 provided at the lower end of the shaft member 2 and the inner bottom surface 7*b*1 of the housing 7 as the thrust bearing portion T come in sliding contact with each other. Thus, the shaft member 2 is supported in a thrust direction in a non-contact manner.

Further, by the axial grooves 8*d*1 formed in the outer peripheral surface 8*d* and the radial grooves 8*c*1 formed in the lower end surface 8*c* of the sleeve portion 8, communication paths are formed between the sleeve portion 8 and the housing 7 (refer to FIG. 2). Each of the communication paths opens at one end thereof to the first axial gap L1, and opens at the other end thereof to a space facing the lower end portion of the shaft member 2, specifically, a space P between the inner bottom surface 7b1 of the housing 7 and the spherical protruding portion 2a2 of the shaft member 2. With this, the space P formed on the closed side of the housing is communicated with the seal space S through intermediation of the communication paths, the first axial gap L1, and the second axial gap L2. With this, it is possible to avoid a problem of generation of local negative pressure in the lubricating oil filling the space P, and possible to prevent deterioration in bearing performance owing to generation of air bubbles.

Further, in this embodiment, the dynamic pressure generating grooves 8a1 of the first radial bearing portion R1 are formed asymmetrically in the axial direction (X1>X2) with respect to the annular smooth portion of an axial intermediate portion (refer to FIG. 3). Thus, when the shaft member 2 is rotated, a drawing force (pumping force) in the upper region of the dynamic pressure generating grooves 8a1 with respect to the lubricating oil becomes relatively larger than a drawing force of the grooves in the lower region thereof. Owing to the differential pressure of the drawing forces, the lubricating oil filled in the gap between the inner peripheral surface 8a of the sleeve portion 8 and the outer peripheral surface 2a1 of the large diameter portion 2a of the shaft portion 2 is allowed to flow downward. The lubricating oil circulates through the paths constituted by the space P on the closed side of the housing 7, the radial grooves 8c1, the axial grooves 8d1, and the first axial gap L1 in the stated order so as to be re-drawn into the radial bearing gap of the first radial bearing portion R1. As in this case, by forcibly causing the lubricating oil in an inside of the bearing to flow and circulate, it is possible to more effectively prevent the problem of generation of the local negative pressure in the lubricating oil. Note that, in a case of circulating the lubricating oil in a direction opposite to that of the paths, the dynamic pressure generating grooves 8a1 may be formed such that imbalance in vertical dimension thereof is opposite to that in the example illustrated in FIG. 3, that is, X1<X2 is satisfied. Further, when it is unnecessary to forcibly circulate the lubricating oil in the inside of the bearing unlike the above case, both the dynamic pressure generating grooves 8a1 and the dynamic pressure generating grooves 8a2 may be formed symmetrically with each other in the axial direction.

The embodiments of the present invention is not limited to that described above. Note that, in the following description, the portions having the same structure and function as those of the above-mentioned embodiment are denoted by the same reference symbols, and description thereof is omitted.

Figure 5:
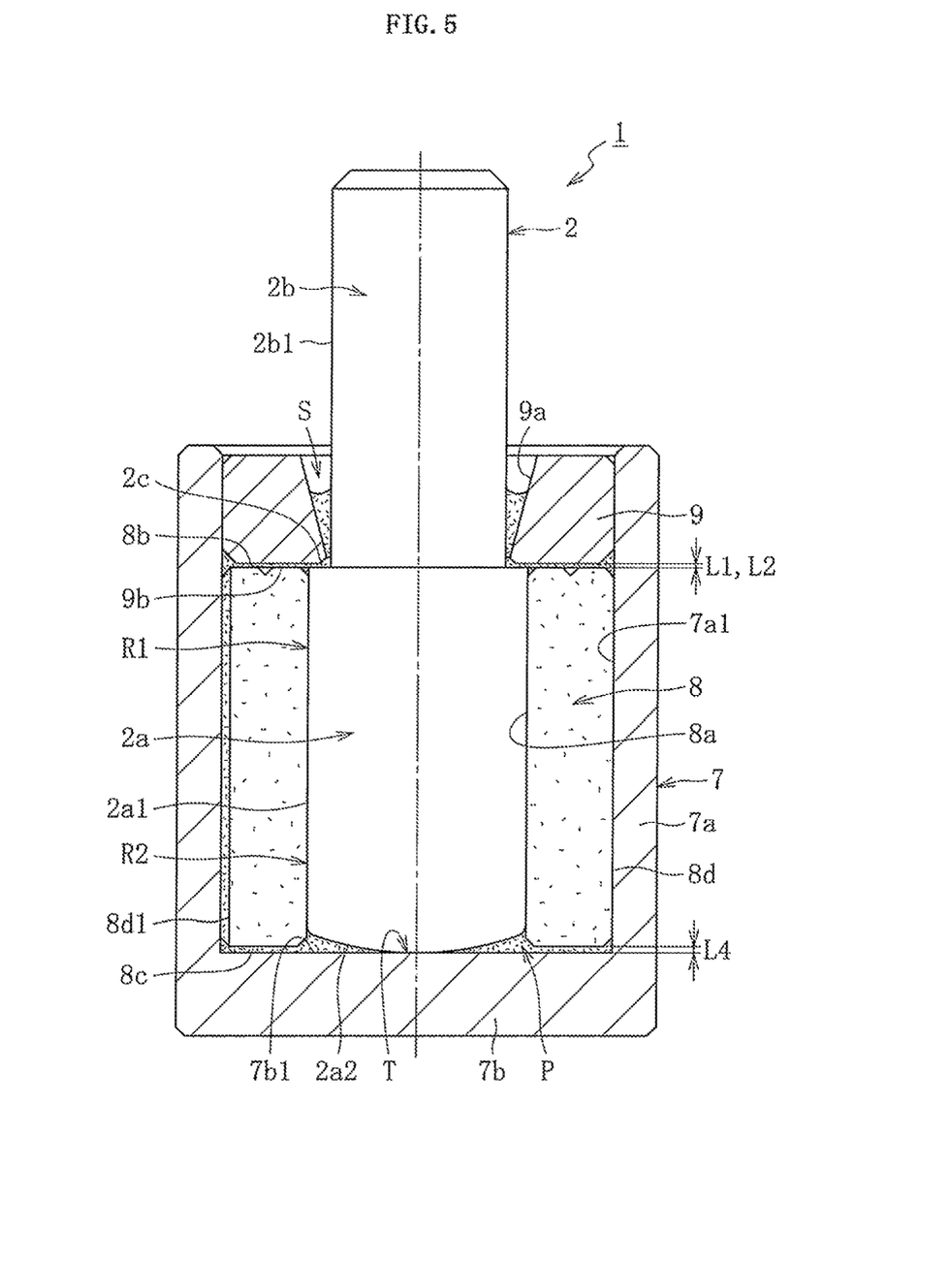
FIG. 5 A sectional view of the fluid dynamic bearing device according to another example.

The fluid dynamic bearing device 1 illustrated in FIG. 5 is structurally different from that described above in this embodiment in that the shoulder surface 2c of the shaft member 2 and the upper end surface 8b of the bearing sleeve 8 are positioned identically to each other in the axial direction, and in that an axial gap L4 is formed between the lower end surface 8c of the bearing sleeve 8 and the inner bottom surface 7b1 of the housing 7. When the axial gap L4 is appropriately set, the axial gap L4 is allowed to constitute a part of the communicating paths communicated between the space P on the closed side of the housing and the seal space S. In this case, it is possible to omit the radial grooves 8c1 formed in the lower end surface 8c of the bearing sleeve 8 in this embodiment illustrated in FIG. 2, and hence possible to simplify the shape of the bearing sleeve 8.

An assembling method for the fluid dynamic bearing device 1 is described with reference to FIG. 6. First, the outer peripheral surface 2b1 of the smaller diameter portion 2b of the shaft member 2 and the inner peripheral surface 9a of the seal portion 9 are fitted to each other, and the end surface 9b of the seal portion 9 and the shoulder surface 2c of the shaft member 2 are brought into contact with each other. The shaft member 2 and the seal portion 9 are vertically inverted with respect to those illustrated in FIG. 5, and placed on an end surface 10a of a base 10 having a cylindrical shape (refer to FIG. 6(a)). Next, the outer peripheral surface 2a1 of the larger diameter portion 2a of the shaft member 2 and the inner peripheral surface 8a of the bearing sleeve 8 are fitted to each other, and the end surface 8b of the bearing sleeve 8 and the end surface 9b of the seal portion 9 are brought into contact with each other (refer to FIG. 6(b)). In this case, the end surface 8b on one side of the bearing sleeve 8 and the shoulder surface 2c of the shaft member 2 are positioned identically to each other in the axial direction, and the spherical protruding portion 2a2 of the shaft member 2 slightly protrudes with respect to the end surface 8c on the other side of the bearing sleeve 8.

Figure 6A:
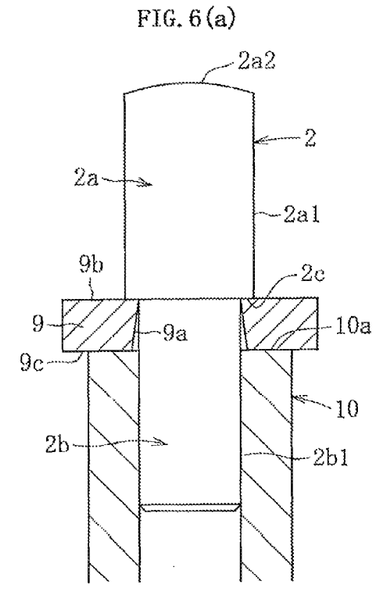
FIG. 6(a) A sectional view illustrating another example of an assembling method for the fluid dynamic bearing device.
Figure 6B:
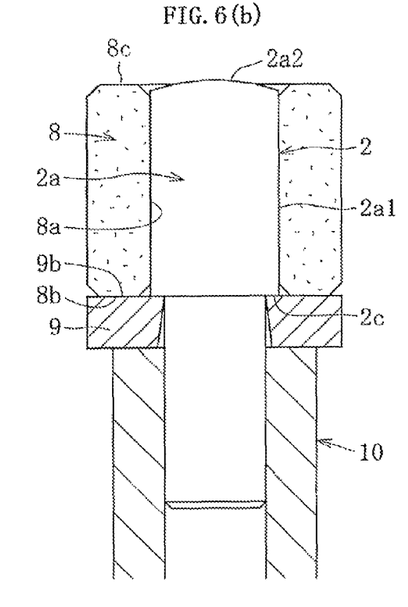
FIG. 6(b) A sectional view illustrating the another example of the assembling method for the fluid dynamic bearing device.
Figure 6C:
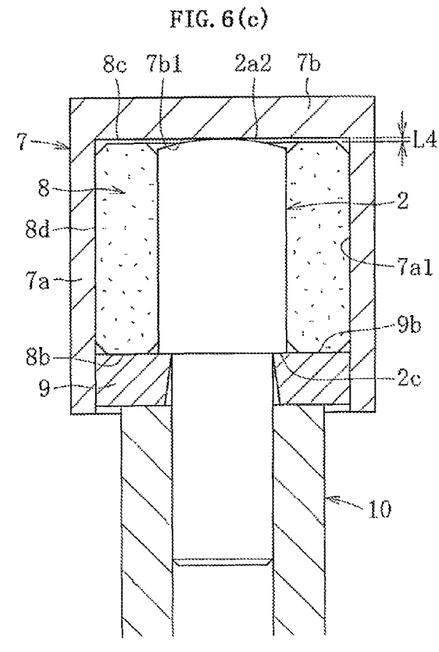
FIG. 6(c) A sectional view illustrating the another example of the assembling method for the fluid dynamic bearing device.
Figure 6D:
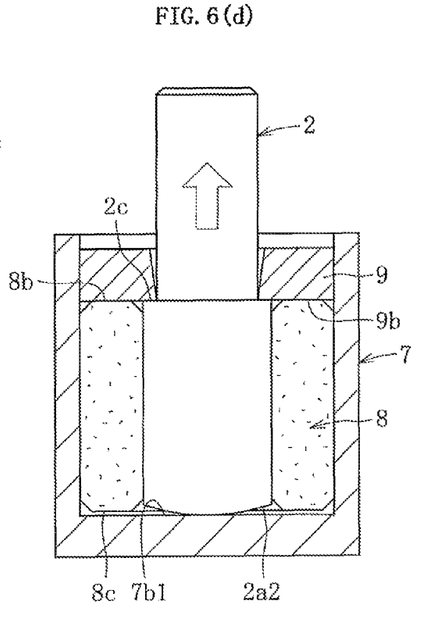
FIG. 6(d) A sectional view illustrating the another example of the assembling method for the fluid dynamic bearing device.

In addition, the outer peripheral surface 8d of the bearing sleeve 8 and the inner peripheral surface 7a1 of the housing 7 are fitted to each other, and the spherical protruding portion 2a2 of the shaft member 2 and the inner bottom surface 7b1 of the housing 7 are brought into contact with each other (refer to FIG. 6(c)). In this case, the axial gap L4 is formed between the end surface 8c of the bearing sleeve 8 and the inner bottom surface 7b1 of the housing 7. In this state, the housing 7 and the bearing sleeve 8 are fixed to each other, and the unit is detached from the base 10 so as to enter the state of FIG. 6(d). After that, the shaft member 2 is pulled toward the opening of the housing so as to move the seal portion 9. With this, the first axial gap L1 is formed between the seal portion 9 and the bearing sleeve 8, and the second axial gap L2 is formed between the seal portion 9 and the shoulder surface 2c of the shaft member 2. In this case, the shoulder surface 2c of the shaft member 2 and the upper end surface 8b of the bearing sleeve 8 are positioned identically to each other in the axial direction. Thus, the first axial gap L1 and the second axial gap L2 are equal to each other (L1=L2). By fixing the seal portion 9 to the housing 7 at this position, the first and second axial gaps L1 and L2 are determined.

Figure 7:
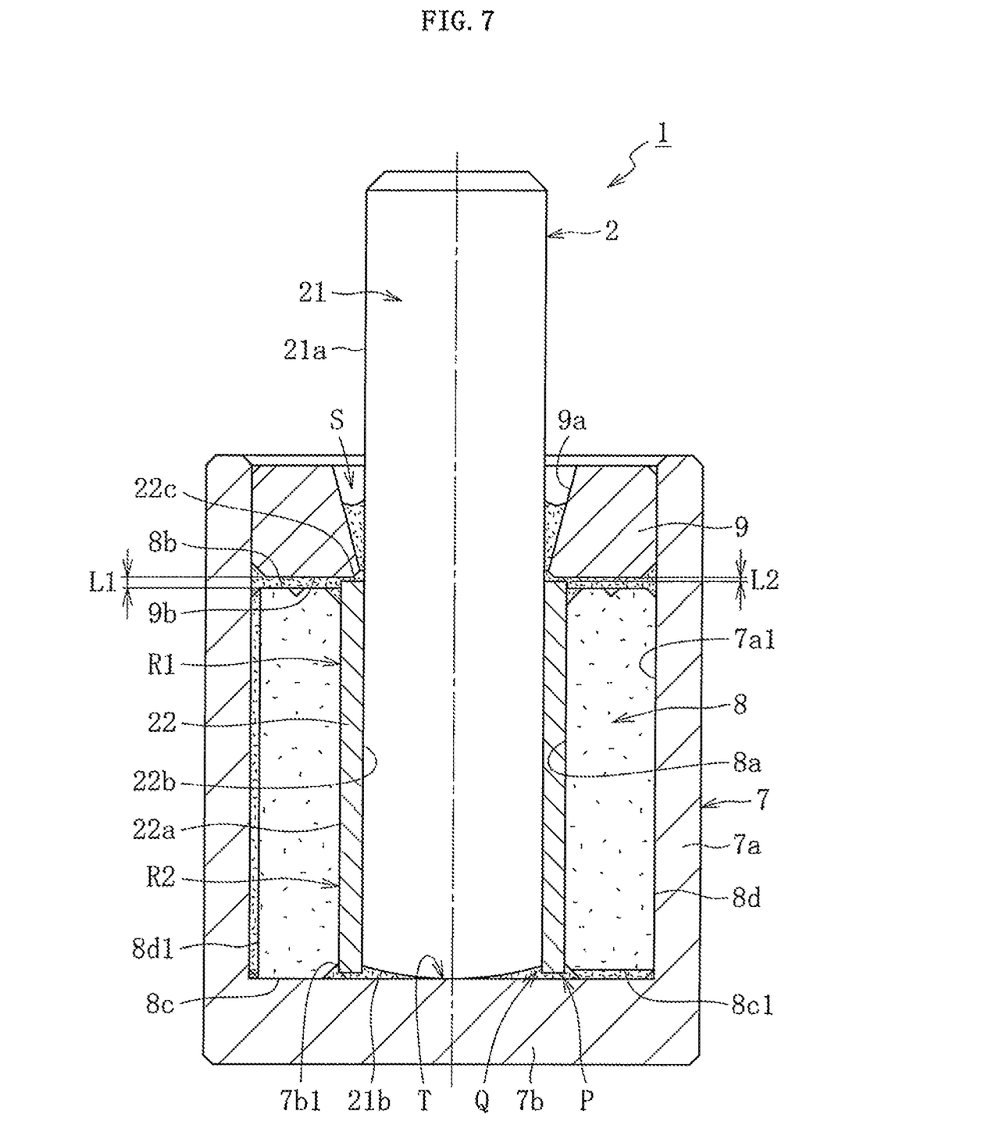
FIG. 7 A sectional view of the fluid dynamic bearing device according to another example.
Figure 8:
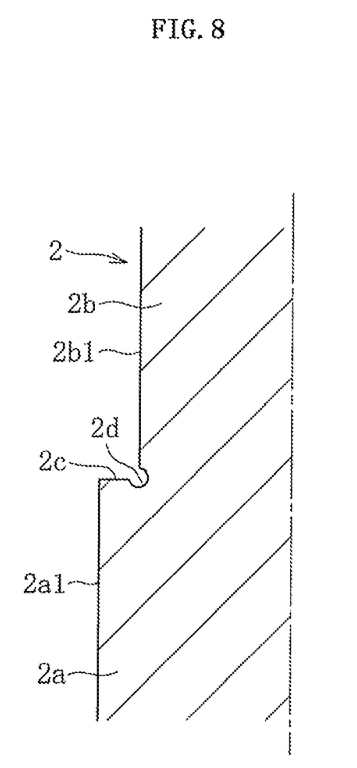
FIG. 8 An enlarged sectional view of a vicinity of a shoulder surface of the shaft member.

Further, the structure of the fluid dynamic bearing device 1 according to the embodiment of the present invention is not limited to that described above. As described above in this embodiment, while the shaft member 2 having a stepped shape is integrally formed, this should not be construed restrictively. For example, as illustrated in FIG. 7, the shaft member 2 may be constituted by a shaft portion 21 having a straight axial shape and a hollow member 22. In the illustration, a spherical protruding portion 21b is formed at a lower end of the shaft portion 21, and an inner peripheral surface 22b of the hollow member 22 having a cylindrical shape is fixed to an outer peripheral surface 21a of the shaft portion 21. An outer peripheral surface 22a of the hollow member 22 faces a radial bearing gap, and an upper end surface 22c of the hollow member 22 constitutes the shoulder surface of the shaft member 2. A lower end of the hollow member 22 extends downward beyond a lower end of the outer peripheral surface 21a of the shaft portion 21 so as to reach an outer periphery of the spherical protruding portion 21b of the shaft portion 21. With this, the hollow member 22 plugs a part of the space P between the lower end of the shaft member 2 and the inner bottom surface 7b1 of the housing 7, and hence it is possible to reduce an amount of the lubricating oil filling the inside of the bearing in comparison with the structure of FIG. 2, for example. Accordingly, the seal space S is reduced which absorbs change in volume of the lubricating oil filling the inside of the bearing. As a result, it is possible to reduce an axial dimension of the seal portion 9, and hence possible to reduce an axial dimension of the bearing device 1 while maintaining bearing performance. In addition, without involving an increase in axial dimension of the bearing device 1, it is possible to increase bearing rigidity by increasing a distance (bearing span) between the radial bearing portions R1 and R2.

The shaft member 2 including the shaft portion 21 and the hollow member 22 is fixed by any means such as press-fitting, bonding, or welding. For example, in a case of effecting fixation by welding, when a radially outer end of the spherical protruding portion 21b at the lower end of the shaft portion 21 and the inner peripheral surface 22b of the hollow member 22 are welded to each other through intermediation of a boundary portion therebetween, a molten material can be received with a recessed portion Q constituted by the spherical protruding portion 21b and the inner peripheral surface 22b of the hollow member 22. Further, by plugging the recessed portion Q with the molten material, the amount of the lubricating oil in the inside of the bearing can be further reduced. Thus, the seal space S is further reduced, and hence it is possible to downsize the bearing device and to further enhance an effect of increasing bearing rigidity.

The shaft member 2 illustrated in FIGS. 2 and 5 is finished by integrally processing the shaft member 2 and then grinding the outer peripheral surface 2a1 of the larger diameter portion 2a, the outer peripheral surface 2b1 of the smaller diameter portion 2b, and the shoulder surface 2c. In this case, as illustrated in FIG. 7, when a grooved portion 2d is formed the boundary portion between the outer peripheral surface 2b1 of the smaller diameter portion 2b and the shoulder surface 2c, it is possible to reliably grind the outer peripheral surface 2b1 of the smaller diameter portion 2b and the shoulder surface 2c to the end portions thereof. Meanwhile, as illustrated in FIG. 7, when the shaft member 2 is constituted by two members: the shaft portion 21 and the hollow member 22, both the shaft portion 21 and the hollow member 22 can be fixed to each other after being processed with high accuracy. Thus, it is unnecessary to form the grooved portion. Note that, in this case, when the outer peripheral surface 22a of the hollow member 22 is grinded after fixation of the shaft portion 21 and the hollow member 22 to each other, the outer peripheral surface 22a can be finished with high accuracy even in consideration of errors in assembly of the shaft portion 21 and the hollow member 22 with each other, the outer peripheral surface 22a facing the radial bearing gap.

In this embodiment, the housing 7 and the sleeve portion 8 are formed separately from each other as described above. Instead, the housing 7 and the sleeve portion 8 may be formed integrally with each other. For example, when the housing 7 and the sleeve portion 8 are formed integrally with each other by injection molding, it is possible to decrease the number of manufacturing steps. As a result, cost reduction can be achieved.

Further, the assembling method for the present invention is not limited to that described above in this embodiment.

Figure 9A:
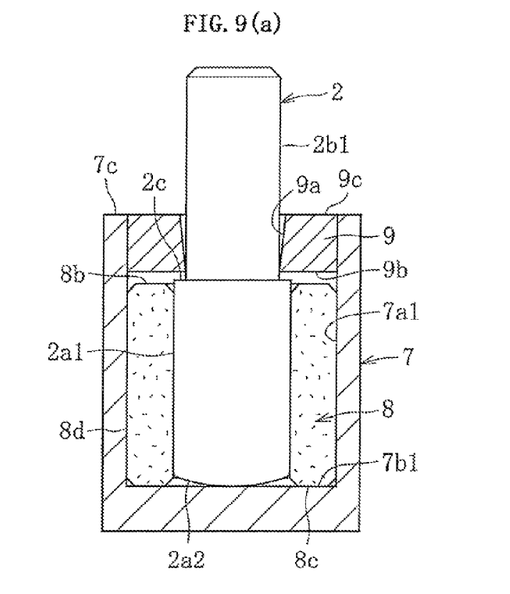
FIG. 9(a) A sectional view illustrating another example of the assembling method for the fluid dynamic bearing device.

FIG. 9 illustrate another example of a positioning method for the seal portion 9. First, as illustrated in FIG. 9(a), the sleeve portion 8 and the shaft member 2 are accommodated on the inner periphery of the housing 7, and the seal portion 9 is arranged at a reference position (position at which upper end surface 9c of seal portion 9 is flush with upper end surface 7c of housing 7, for example) on the inner periphery of the housing 7. In this case, between the seal portion 9 and the sleeve portion 8, there is provided a gap larger than the first axial gap L1 illustrated in FIG. 2.

Figure 9B:
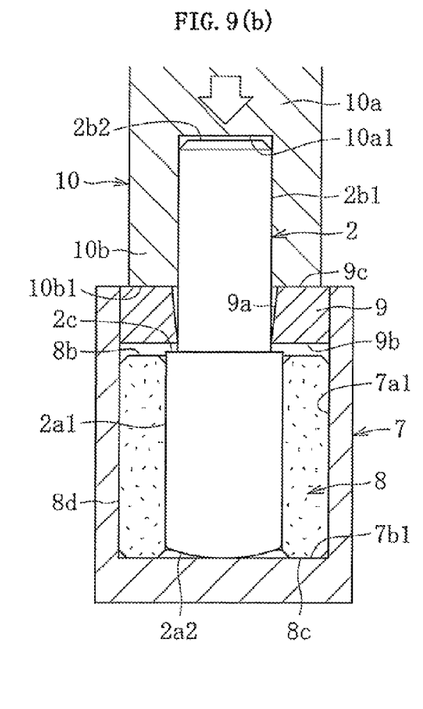
FIG. 9(b) A sectional view illustrating the another example of the assembling method for the fluid dynamic bearing device.
Figure 9C:
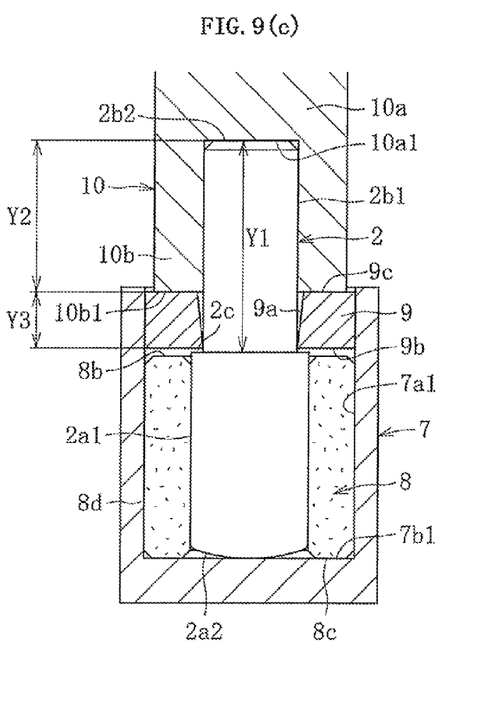
FIG. 9(c) A sectional view illustrating the another example of the assembling method for the fluid dynamic bearing device.

Next, the seal portion 9 is pushed-in downward by a predetermined amount. For example, as illustrated in FIG. 9(b), with use of a push-in member 10 including a proximal portion 10a and a cylindrical portion 10b, the seal portion 9 is pushed-in downward (arrow direction). A reference surface 10a1 defining a pushing-in amount is formed on the proximal portion 10a, and an inner periphery of the cylindrical portion 10b is fitted to the smaller-diameter outer peripheral surface 2b1 of the shaft member 2, and an lower end surface 10b1 thereof constitutes a pushing-in surface for pushing-in the upper end surface 9c of the seal portion 9. Then, as illustrated in FIG. 9(c), at a time point when the reference surface 10a1 of the push-in member 10 is brought into contact with an upper end surface 2b2 of the shaft member 2, pushing-in is completed. In this case, on the premise that an axial dimension of the smaller-diameter outer peripheral surface 2b1 of the shaft member 2 is Y1, an axial gap between the reference surface 10a1 and the pushing-in surface 10b1 of the push-in member 10 is Y2, and an axial dimension of the seal portion 9 is Y3, the difference between Y1 and Y2+Y3 represents the second axial gap L2 (L2=Y1−(Y2+Y3)). Accordingly, by setting Y1, Y2 and Y3 with high accuracy, a stroke amount of the shaft member 2 can be controlled with high accuracy.

Figure 10:
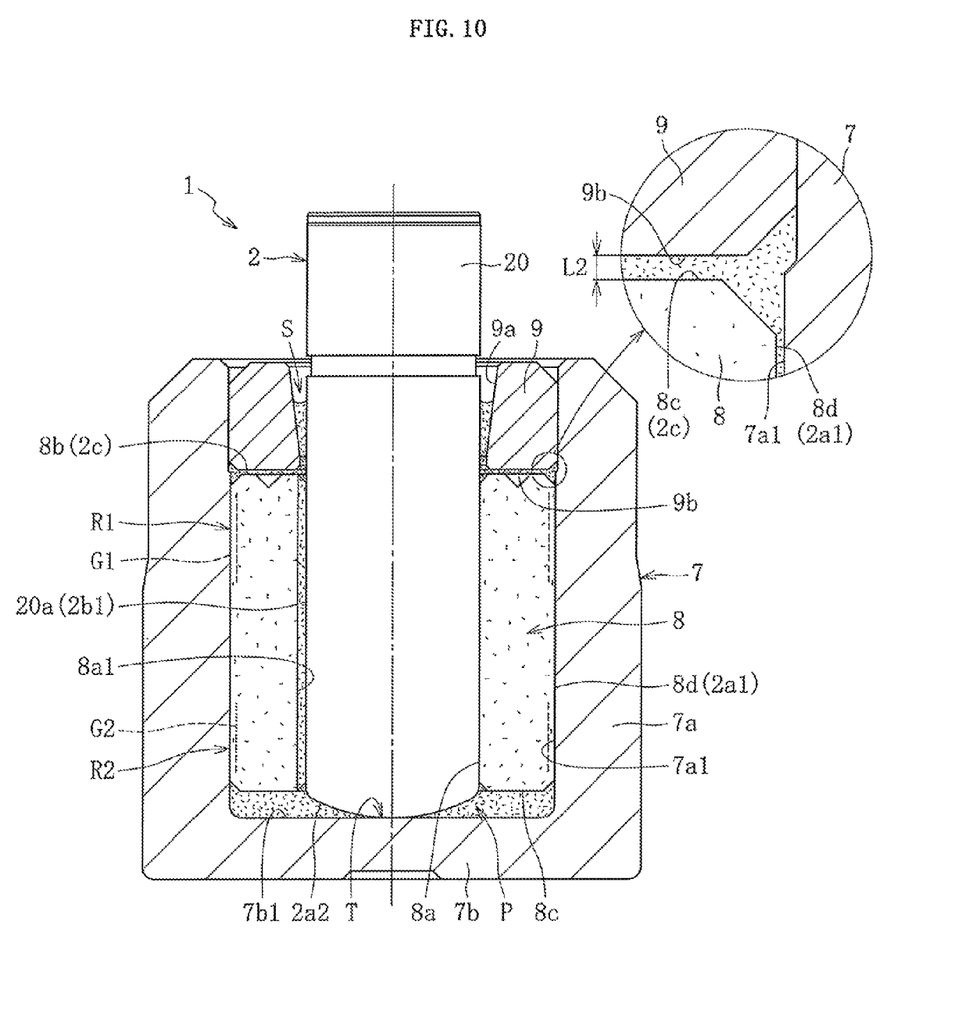
FIG. 10 A sectional view of the fluid dynamic bearing device according to another example.

Further, the structure of the fluid dynamic bearing device to which the assembling method of the present invention is applicable is not limited to that described above in this embodiment. For example, the assembling method of the present invention is also applicable to the fluid dynamic bearing device 1 as illustrated in FIG. 10. In the fluid dynamic bearing device 1, the shaft member 2 is constituted by a shaft portion 20 and the sleeve portion 8 each of which has a cylindrical shape. The shaft member 2 is formed by fixing an outer peripheral surface 20a of the shaft portion 20 and the inner peripheral surface 8a of the sleeve portion 8 to each other by an appropriate means such as press-fitting, bonding, and press-fit bonding. In the shaft member 2, the upper end surface 8b of the sleeve portion 8 constitutes the shoulder surface 2c of the shaft member 2, the outer peripheral surface 8d of the sleeve portion 8 constitutes the larger-diameter outer peripheral surface 2a1 of the shaft member 2, and the outer peripheral surface 20a of the shaft portion 20 constitutes the smaller-diameter outer peripheral surface 2b1 of the shaft member 2. A spherical protruding portion 2d is formed at a lower end portion of the shaft portion 20.

In the larger-diameter outer peripheral surface 2a1 (outer peripheral surface 8d of sleeve portion 8) of the shaft member 2, there are formed dynamic pressure generating grooves G1 and G2 as radial dynamic pressure generating portions in two regions spaced apart from each other in the upper and lower directions (indicated with dotted lines in FIG. 10), and there are formed radial bearing gaps between the regions and the inner peripheral surface 7a1 of the housing 7. Further, between the shoulder surface 2c (upper end surface 8b of sleeve portion 8) of the shaft member 2 and the lower end surface 9b of the seal portion 9, the second axial gap L2 is formed which corresponds to the stroke amount of the shaft member 2 (refer to the enlarged part in FIG. 10). The axial grooves 8a1 are formed in the inner peripheral surface 8a of the sleeve portion 8, and communication paths are formed between the inner peripheral surface 8a and the outer peripheral surface 20a of the shaft portion 20. The communication paths communicate the space P formed on the closed side of the housing 7 with the seal space S, the space P formed between the spherical protruding portion 2d formed at the lower end portion of the shaft portion 20 and the lower end surface 8c of the sleeve portion 8 and the inner bottom surface 7b1 of the housing 7.

By constituting the shaft member 2 with the shaft portion 20 and the sleeve portion 8 as in this case, it is unnecessary to perform processing for the stepped shape as that of the shaft member 2 illustrated in FIG. 2. As a result, it is possible to reduce processing cost of the members. Further, by constituting the larger-diameter outer peripheral surface 2a1 of the shaft member 2 with the outer peripheral surface 8d of the sleeve portion 8, it is possible to increase in diameter the radial bearing gaps facing the larger-diameter outer peripheral surface 2a1 in comparison with the fluid dynamic bearing device 1 illustrated in FIG. 2 so as to enlarge the radial bearing portions R1 and R2. Thus, it is possible to increase bearing performance in the radial direction.

Figure 11:
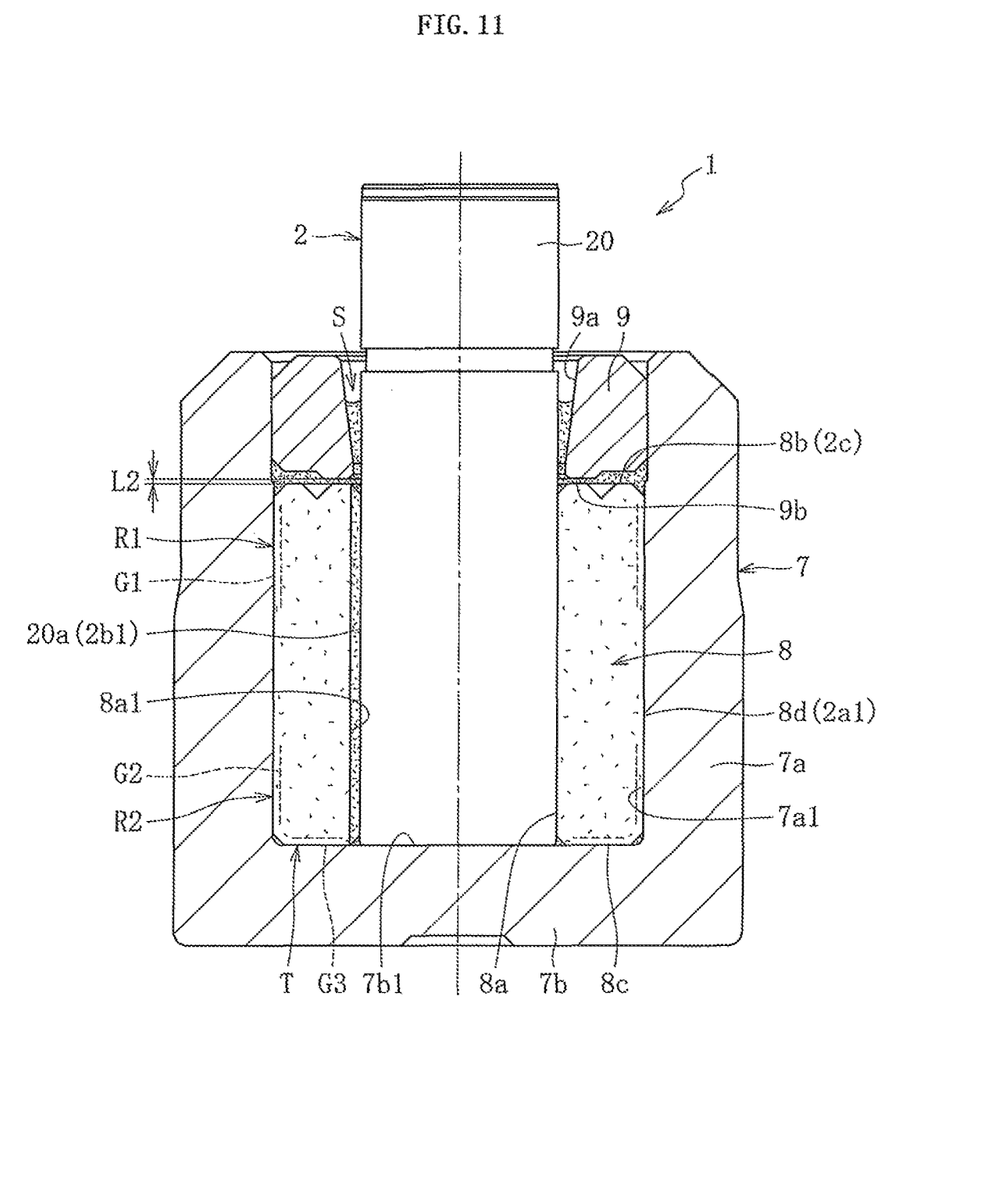
FIG. 11 A sectional view of the fluid dynamic bearing device according to another example.

Further, the assembling method of the present invention is also applicable to the fluid dynamic bearing device 1 as illustrated in FIG. 11. The fluid dynamic bearing device 1 is structurally different from that illustrated in FIG. 10 in this embodiment in that the shaft member 2 is supported in the thrust direction in a non-contact manner. Specifically, there is formed a thrust bearing gap between the lower end surface 8c of the sleeve portion 8 and the inner bottom surface 7b1 of the housing 7. When the shaft member 2 is rotated, dynamic pressure generating grooves G3 formed in the lower end surface 8c of the sleeve portion 8 in a spiral pattern or in a stepped pattern generate dynamic pressure effect in the lubricating oil in the thrust bearing gap so as to constitute the thrust bearing portion T for supporting the shaft member 2 in the thrust direction. In this case, the second axial gap L2 between the lower end surface 9b of the seal portion 9 and the shoulder surface 2c of the shaft member 2 (upper end surface 8b of sleeve portion 8) is set to be larger than the thrust bearing gap of the thrust bearing portion T.

As illustrated in FIGS. 10 and 11, when the shaft member 2 is constituted by the shaft portion 20 and the sleeve portion 8, the shaft portion 20 and the sleeve portion 8 may be separately formed and fixed to each other as described above. Alternatively, the sleeve portion 8 may be formed by die molding together with the shaft portion 20 as an insert. With this, it is unnecessary to perform an assembly step for the shaft portion 20 and the sleeve portion 8, and hence possible to simplify manufacturing steps.

Further, as described above in this embodiment, the herringbone dynamic pressure generating grooves 8a1 and 8a2 are formed in the inner peripheral surface 8a of the sleeve portion 8 as a dynamic pressure generating portion for generating a dynamic pressure effect in the lubricating fluid between the radial bearing gap. However, the shape of the dynamic pressure generating grooves is not limited thereto. For example, spiral dynamic pressure generating grooves, a step bearing, or a multi-arc bearing may be adopted. Alternatively, a so-called cylindrical bearing in which the inner peripheral surface 8a of the sleeve 8 and the outer peripheral surface 2a1 of the large diameter portion 2a of the shaft portion 2 are formed into a cylindrical surface shape may be structured.

Further, as described above in this embodiment, while the structure is illustrated in which the shaft member 2 is supported by the thrust bearing portion T in a contact manner, this should not be construed restrictively. For example, a thrust bearing gap may be formed between the lower end surface of the shaft member 2 and the inner bottom surface 7b1 of the housing 7 so as to constitute a thrust bearing portion T for supporting the shaft member 2 in a non-contact manner with dynamic pressure effect of the lubricating oil in the thrust bearing gap.

Further, as described above in this embodiment, while the dynamic pressure generating grooves 8a1 and 8a2 are formed in the inner peripheral surface 8a of the sleeve portion 8, the dynamic pressure generating grooves may be formed in the outer peripheral surface 2a1 of the larger diameter portion 2a of the shaft member 2, the outer peripheral surface 2a1 facing the inner peripheral surface 8a through intermediation of the bearing gaps.

Further, as described above in this embodiment, while radial bearing portions R1 and R2 are provided separately from each other in the axial direction, the radial bearing portions R1 and R2 may be continuously provided in the axial direction. Alternatively, only any one of the radial bearing portions R1 and R2 may be provided.

Further, as described above in this embodiment, while a lubricating oil is exemplified as the fluid filling the interior of the fluid dynamic bearing device 1 and generating a dynamic pressure effect in the radial bearing gap, it is also possible to use some other fluid capable of generating a dynamic pressure effect in each bearing gap, for example, a gas such as air, a magnetic fluid, or a lubricating grease.

Further, the fluid dynamic bearing device of the present invention is not restricted to a spindle motor as described above to be used in a disk drive such as an HDD. The fluid dynamic bearing device of the present invention is also suitably applicable to the supporting of the rotary shaft of a small motor for an information apparatus used under high speed rotating condition, such as a spindle motor for driving an optical disk or a magneto-optical disk or a polygon scanner motor in a laser beam printer, or a fan motor for a cooling fan of an electrical apparatus.

DESCRIPTION OF SYMBOLS 1 fluid dynamic bearing device
2 shaft member
2a larger diameter portion
2b smaller diameter portion
2c shoulder surface
7 housing
8 sleeve portion
8c1 radial groove
8d1 axial groove
9 seal portion
L1 first axial gap
L2 second axial gap
L3 radial dimension of seal space
R1, R2 radial bearing portion
T thrust bearing portion
S seal space

The invention claimed is:

1. A fluid dynamic bearing device, comprising:
a shaft member comprising:
a smaller diameter portion;
a larger diameter portion; and
a shoulder surface formed therebetween;
a sleeve portion in which the larger diameter portion of the shaft member is inserted along an inner periphery thereof;
a seal portion which forms a seal space, between the seal portion and an outer peripheral surface of the smaller diameter portion of the shaft member, for preventing a lubricating fluid in an inside of the fluid dynamic bearing device from leaking to an outside, and which retains the shaft member by being engaged with the shoulder surface of the shaft member in an axial direction;
a radial bearing portion for supporting the shaft member in a radial direction with a fluid film generated in a radial bearing gap between an outer peripheral surface of the larger diameter portion of the shaft member and an inner peripheral surface of the sleeve portion; and
a thrust bearing portion for supporting the shaft member in a thrust direction,
wherein a first axial gap is formed between the seal portion and the sleeve portion.

2. A fluid dynamic bearing device according to claim 1, wherein a second axial gap formed between the seal portion and the shoulder surface of the shaft member has a dimension equal to or smaller than a radial dimension of the seal space.

3. A fluid dynamic bearing device according to claim 2, wherein the second axial gap is 30 µm or smaller.

4. A fluid dynamic bearing device according to claim 1, wherein a communication path is provided between the sleeve portion and the housing in which the sleeve portion is accommodated on the inner periphery thereof, the communication paths opening at one end thereof to the first axial gap and opening at another end thereof to a space facing a lower end portion of the shaft member.

5. A fluid dynamic bearing device according to claim 4, wherein the communication path is constituted by a groove formed in an end surface and an outer peripheral surface of the sleeve portion.

6. A fluid dynamic bearing device according to claim 1, wherein:
the shaft member is constituted by a shaft portion and a hollow member fixed to an outer peripheral surface of the shaft portion; and
the shoulder surface of the shaft member is constituted by an end surface of the hollow member.

7. A fluid dynamic bearing device according to claim 6, wherein:
a spherical protruding portion is formed at an end of the shaft portion;
the thrust bearing portion is constituted by the spherical protruding portion supported in a contact manner; and
an end of the hollow member is extended to an outer periphery of the spherical protruding portion of the shaft portion.

8. A fluid dynamic bearing device according to claim 1, which is used in an HDD spindle motor.

9. An assembling method for a fluid dynamic bearing device, the fluid dynamic bearing device comprising:
a shaft member comprising:
a smaller-diameter outer peripheral surface;
a larger-diameter outer peripheral surface; and
a shoulder surface formed therebetween;
a housing in which the shaft member is accommodated on an inner periphery thereof;
a seal portion which is fixed to the inner periphery of the housing so as to form, between the seal portion and the smaller-diameter outer peripheral surface of the shaft member, a seal space for preventing a lubricating fluid in an inside of the fluid dynamic bearing device from leaking to an outside, and which retains the shaft member by being engaged with the shoulder surface of the shaft member in an axial direction; and
a radial bearing gap facing the larger-diameter outer peripheral surface of the shaft member,
the assembling method comprising setting, by moving the seal portion with respect to the housing in an axial direction, an axial gap between the seal portion and the shoulder surface of the shaft member.

10. An assembling method for a fluid dynamic bearing device according to claim 9, wherein:
the shaft member and the seal portion are accommodated on the inner periphery of the housing;
the seal portion and the shoulder surface of the shaft member are brought into contact with each other; and
the seal portion is moved with the shaft member toward an opening of the housing.

11. An assembling method for a fluid dynamic bearing device according to claim 9, wherein the smaller-diameter outer peripheral surface, the larger-diameter outer peripheral surface, and the shoulder surface of the shaft member are formed integrally with each other.

12. An assembling method for a fluid dynamic bearing device according to claim 9, wherein:
the shaft member comprises:
a shaft portion; and
a sleeve portion fixed to an outer peripheral surface of the shaft portion; and
the shoulder surface is constituted by an end surface of the sleeve portion.

13. An assembling method for a fluid dynamic bearing device according to claim 9, wherein:

the shaft member comprises:
- a shaft portion; and
- a sleeve portion formed by die-molding together with the shaft member as an insert; and the shoulder surface is constituted by an end surface of the sleeve portion.

14. An assembling method for a fluid dynamic bearing device according to claim 9, wherein the seal portion is moved in a state in which a lubricant is interposed between engagement surfaces of the seal portion and the housing.

15. An assembling method for a fluid dynamic bearing device according to claim 14, wherein the lubricant comprises an adhesive.

16. An assembling method for a fluid dynamic bearing device according to claim 9, wherein, after positioning of the seal portion, engagement surfaces of the seal portion and the housing are bonded to each other in a sealing manner on a side opening to air.

\* \* \* \* \*